Feb. 27, 1951 E. R. ABBEY 2,543,264
VEHICLE JACK
Filed Dec. 5, 1947 2 Sheets-Sheet 1
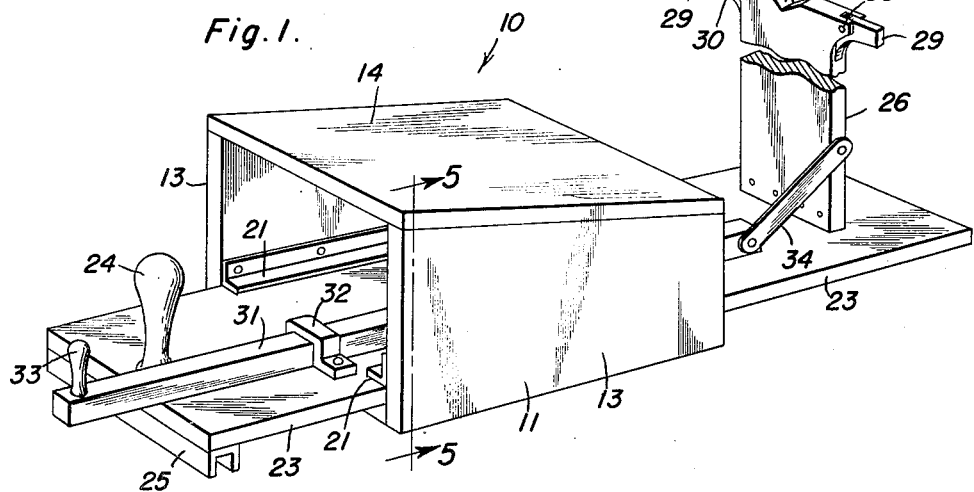
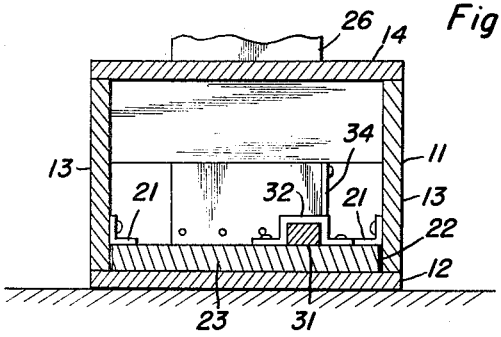
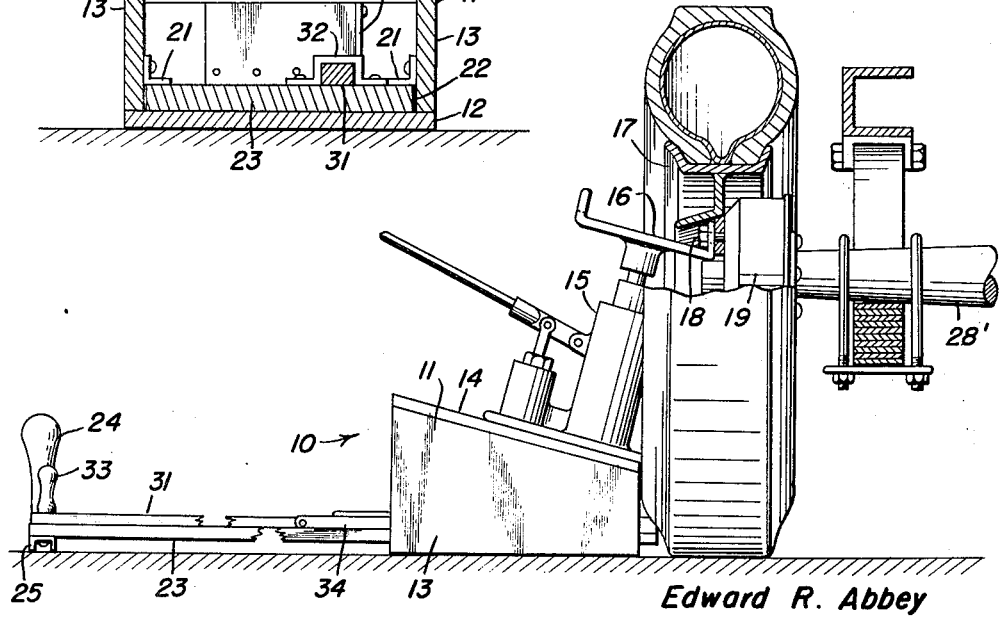
Edward R. Abbey
INVENTOR.

Edward R. Abbey
INVENTOR.

Patented Feb. 27, 1951

2,543,264

UNITED STATES PATENT OFFICE 2,543,264

VEHICLE JACK

Edward R. Abbey, Madison, Tenn.

Application December 5, 1947, Serial No. 789,842

2 Claims. (Cl. 254—133)

This invention relates to new and useful improvements and structural refinements in vehicle jacks, and the principal object of the invention is to provide a device of the character herein described, such as may be employed for quickly, easily and conveniently raising and supporting in an upraised position a vehicle wheel, such as for example, in the event of a flat tire.

Needless to say, several types of jacks have been devised for this purpose and many of them are in common use. However, taken as a whole, these conventional jacks do not always perform a satisfactory service, either because they do not find adequate support on the slanting, under surfaces of the spring leaves which they are adapted to engage, or because they are too high, so to speak, in their collapsed or folded position, to facilitate their insertion under the spring or axle, or particularly under the so-called individual front wheel suspension. Moreover, other types of conventional jacks, such as for example, the bumper type, are somewhat unstable, inasmuch as they necessitate lifting of the entire vehicle before the wheel leaves the ground.

It is, therefore, a further object of the invention to eliminate the various disadvantages above outlined by providing a jack which may be quickly and easily applied to a wheel for the purpose of lifting the same, and which also embodies in its construction means for supporting the wheel in an upraised position while repairs of the tire, or the like, are in progress.

Another object of the invention is to provide a vehicle jack which is simple in construction and which may be easily transported and stored.

An additional object of the invention is to provide a vehicle jack which will not easily become damaged, which will readily lend itself to economical manufacture, and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a perspective view of the invention with the jack unit removed;

Figure 2 is a side elevational view of the invention shown in the wheel raising position;

Figure 5 is a cross-sectional view, taken substantially in the plane of the line 5—5 in Figure 1.

Like characters of reference are employed to designate like parts in the specification and throughout the several views.

Figure 3:
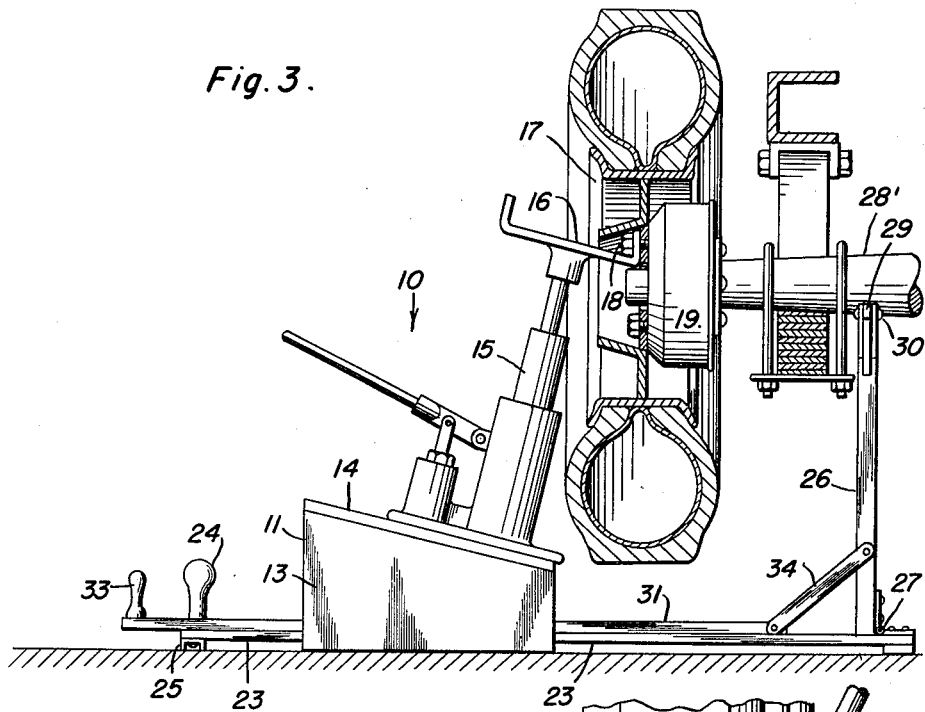
Figure 3 is a further side elevational view of the invention after the wheel raising operation has been completed and the wheel is supported in an upraised position.

Referring now to the accompanying drawings in detail, the invention consists of a vehicle jack designated generally by the reference character 10, the same embodying in its construction a base 11 assuming the form of a box-like structure including a bottom 12, a pair of upstanding side walls 13 and an inclined platform 14, as will be clearly apparent.

A suitable jack unit, such as for example, a conventional hydraulic jack 15 is removably positioned on the platform 14, the jack unit 15 including a liftable and lowerable member 16 which, in this instance, is provided with a suitable aperture so that it may be firmly secured to a vehicle wheel 17 by means of a wheel stud 18 whereby the wheel is usually attached to the brake drum and hub 19.

It will be apparent that by virtue of the inclination of the platform 14, the member 16 of the jack unit 15 may be attached to the wheel 17 without interfering with the latter, and also, a more direct line of force between the load and the jack unit will be provided, that is to say, the wheel 17 will be raised obliquely, so to speak, as indicated by the arrow 20, rather than vertically, which condition is of course advantageous since the wheel at the relatively opposite side of the vehicle (not shown) is assumed to remain on the ground.

A pair of L-shaped members 21 are secured to the inner surfaces of the side walls 13 of the base 11, the members 21 coacting with the bottom 12 of the base to provide what may be referred to as a transverse channel 22 which slidably accommodates a carrier plate 23.

One end of the carrier plate 23 is equipped with an upstanding handle 24 and with a downwardly projecting leg or support 25, while an extensible and collapsible axle support 26 is attached to the remaining end portion of the carrier plate by means of a suitable hinge 27.

Figure 4:
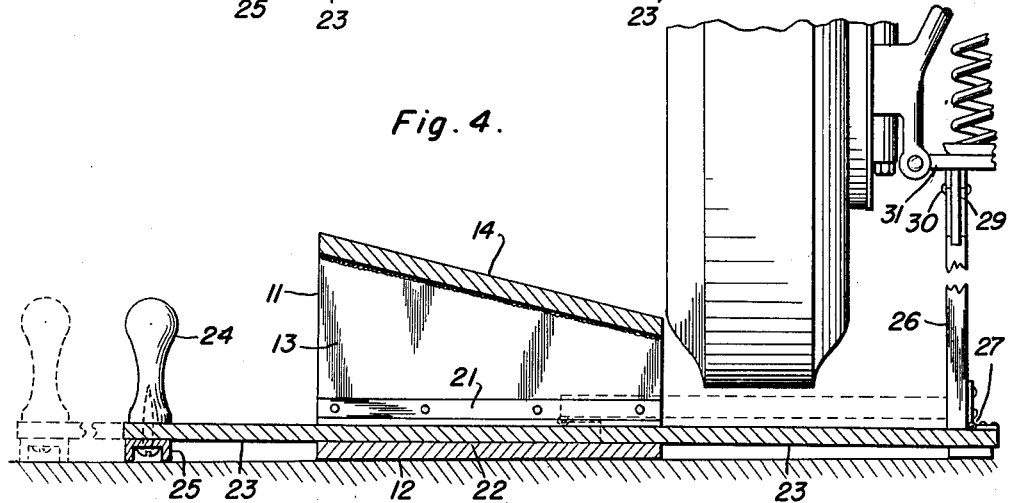
Figure 4 is a cross-sectional view of the invention in the wheel supporting position, the same being shown with the jack unit removed.

The free upper end of the support 26 is formed with a seat 28 adapted to engage the vehicle axle 28', and the support is also provided with a pair of laterally projectible dogs 29 which are pivotally connected to the main body portion of the support as at 30. These dogs, in their laterally projected positions, serve to increase the width of the support 26 so as to adequately accommodate the "wish-bone" 31 of the so-called individual wheel suspension, as shown in Figure 4. However, the dogs 29 may be retracted, so to speak, so as to facilitate free sliding action of the support 26 and of the associated carrier plate 23 through the channels 22, as will be hereinafter more fully described.

Means are provided for extending and collapsing the support 26 on the carrier plate 23, said means including a control bar 31 which is slidable in suitable brackets 32 provided on the carrier plate 23, one end portion of the bar 31 being equipped with a handle 33, while a link 34 pivotally connects the remaining end of the bar to the support 26, as will be clearly apparent from the accompanying drawings.

When the invention is placed in use, the carrier plate 23 together with the axle support 26 in its collapsed position, is pulled outwardly from the base 13 to a position shown in Figure 2, and after the member 16 of the jack unit 15 is secured to the wheel 17 as has been already explained, the wheel may be raised by simply actuating the jack unit.

This is illustrated in the accompanying Figure 3, wherein the wheel is shown in an upraised position, and at this stage of the proceeding the carrier plate 23, together with the support 26, is slid inwardly under the vehicle by means of the handle 24. Up to this point, the support 26 has been disposed in flat parallel relation with respect to the carrier plate 23, but the support 26 may now be raised or extended by simply pulling the handle 33 outwardly to a position shown in Figure 3, so as to elevate the support 26 as shown. By "lowering" the jack unit 15, the axle 28' will be brought to rest upon the upraised support 26, and the jack unit 15 may then be removed from the platform 14, so as to facilitate removal of the wheel 17 from the hub 19, as will be clearly apparent.

Needless to say, after the wheel is reapplied to the hub and drum 19, the vehicle may be lowered by simply reversing the procedure above outlined.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In a vehicle jack including a hollow base and a wheel engaging jack unit positioned thereon, the improvement comprising an axle supporting means comprising an elongated carrier slidable through said base under a vehicle, an axle supporting member hingedly connected to the inner end portion of said carrier and swingable from a collapsed position on the carrier to a vertical operative position, a set of longitudinally spaced guides provided on said carrier, an actuating bar slidable in said guides, and a link pivoted to the inner end of said bar and to an intermediate portion of said supporting member, whereby the latter may be collapsed and erected by the sliding of said bar relative to the carrier.

2. The device as defined in claim 1 together with laterally projectable axle-supporting dogs pivotally attached to said member at opposite sides of the latter adjacent its upper end.

EDWARD R. ABBEY.

REFERENCES CITED

The following references are of record in the file of this patent:

UNITED STATES PATENTS

| Number | Name | Date |
| --- | --- | --- |
| 2,205,719 | Forehand | June 25, 1940 |